United States Patent [19]

Stoller et al.

[11] 4,237,927
[45] Dec. 9, 1980

[54] AUTOMATIC AIR INLET AND OUTLET VALVE ASSEMBLY

[75] Inventors: Patricia S. Stoller, Plymouth, Mich.; John A. Krug, Jr., St. Charles; Gerald D. Garner, Florissant, both of Mo.

[73] Assignee: ACF Industries, Incorporated, New York, N.Y.

[21] Appl. No.: 35,862

[22] Filed: May 3, 1979

Related U.S. Application Data

[63] Continuation of Ser. No. 808,916, Jun. 22, 1977, abandoned.

[51] Int. Cl.³ .............................................. F16K 24/00
[52] U.S. Cl. ..................................... 137/587; 251/144
[58] Field of Search ............... 137/348, 350, 585, 586, 137/587, 588, 589; 251/144

[56] References Cited

U.S. PATENT DOCUMENTS

| 314,692 | 3/1885 | Leavitt et al. | 137/587 |
|---|---|---|---|
| 1,591,726 | 7/1926 | Neuls | 251/144 |
| 2,026,196 | 12/1935 | Stephens | 251/144 |
| 2,097,661 | 11/1937 | Hammond | 251/144 |
| 2,409,071 | 10/1946 | Scott et al. | 137/587 |
| 2,556,221 | 6/1951 | Samiran | 137/587 |
| 2,730,126 | 1/1956 | Jensen | 137/587 |
| 3,125,320 | 3/1964 | De Frees | 137/587 |
| 3,149,642 | 9/1964 | Marx | 137/587 |
| 3,486,528 | 12/1969 | De Frees | 137/587 |
| 3,981,325 | 9/1976 | Robinson et al. | 137/587 |

Primary Examiner—William R. Cline
Assistant Examiner—H. Jay Spiegel
Attorney, Agent, or Firm—Henry W. Cummings

[57] ABSTRACT

In accordance with the present invention an air inlet and outlet valve is disclosed which automatically opens and closes when a bottom operable tank lading valve is opened and closed. The air valve is mounted adjacent the top of the tank and is in fluid communication by means of a conduit with an opening in the tank. The air valve is automatically opened and closed when the lading valve opens and closes by means of an air valve linkage including an operating shaft which extends from the lading valve up through the tank to operate the air valve.

3 Claims, 15 Drawing Figures

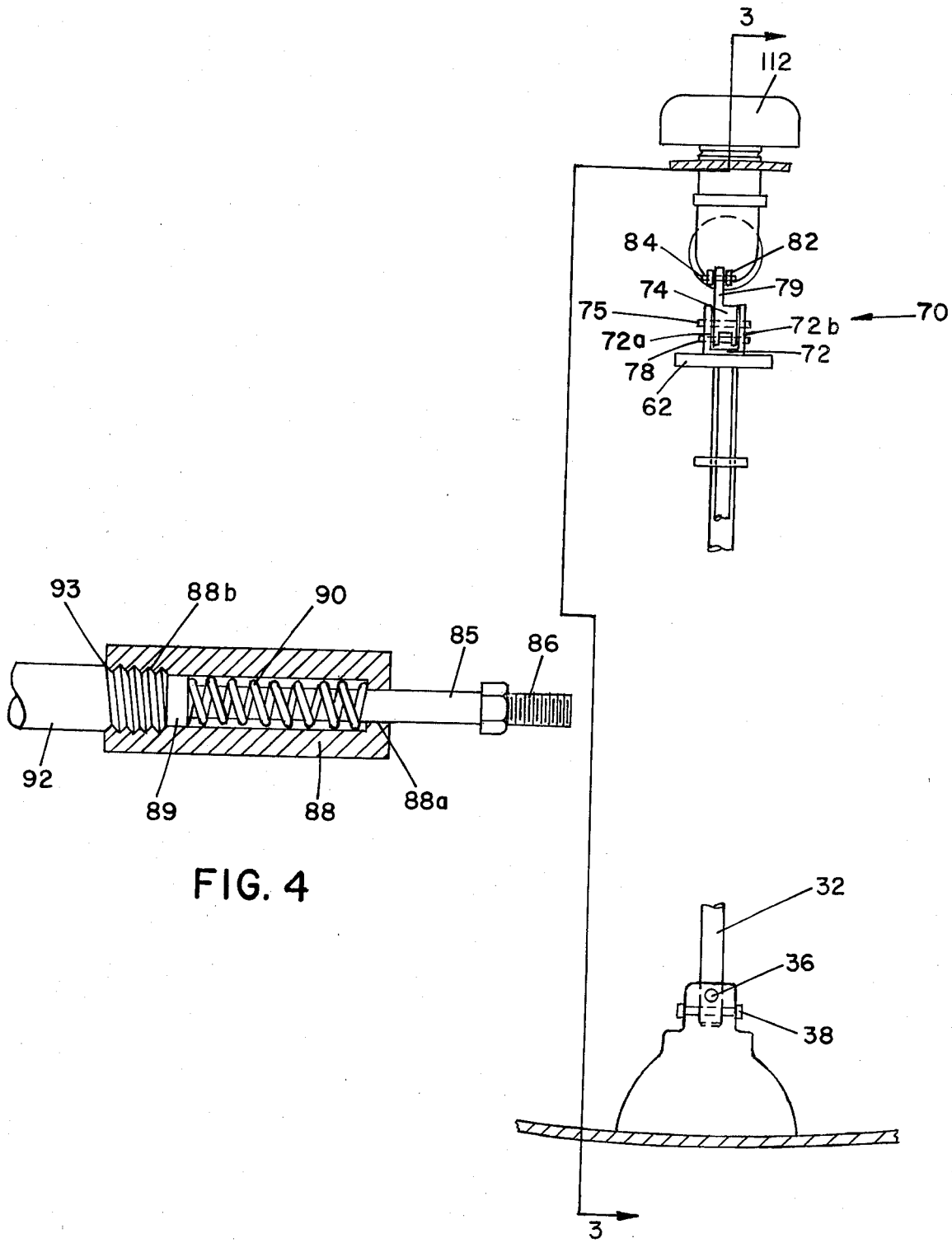

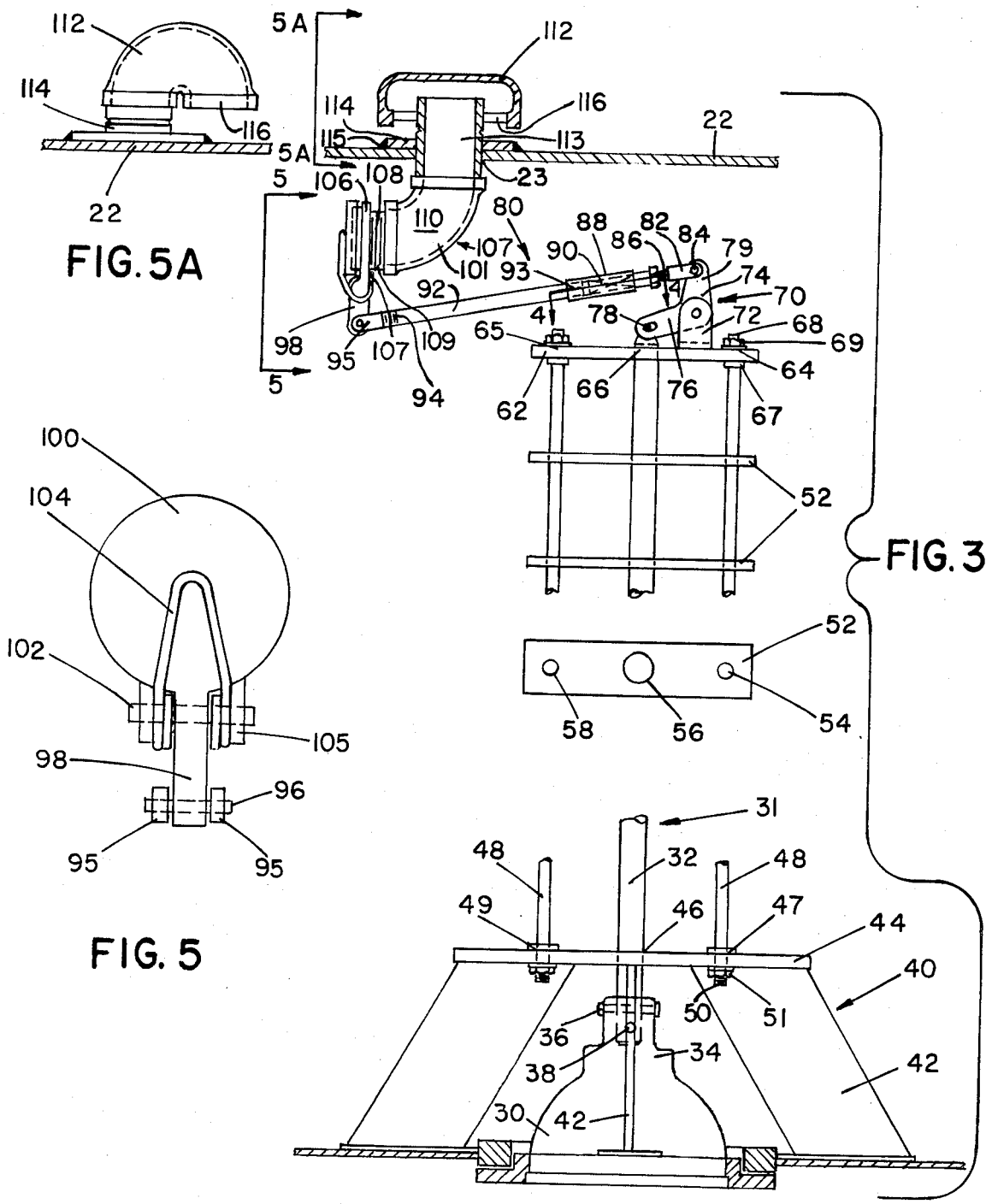

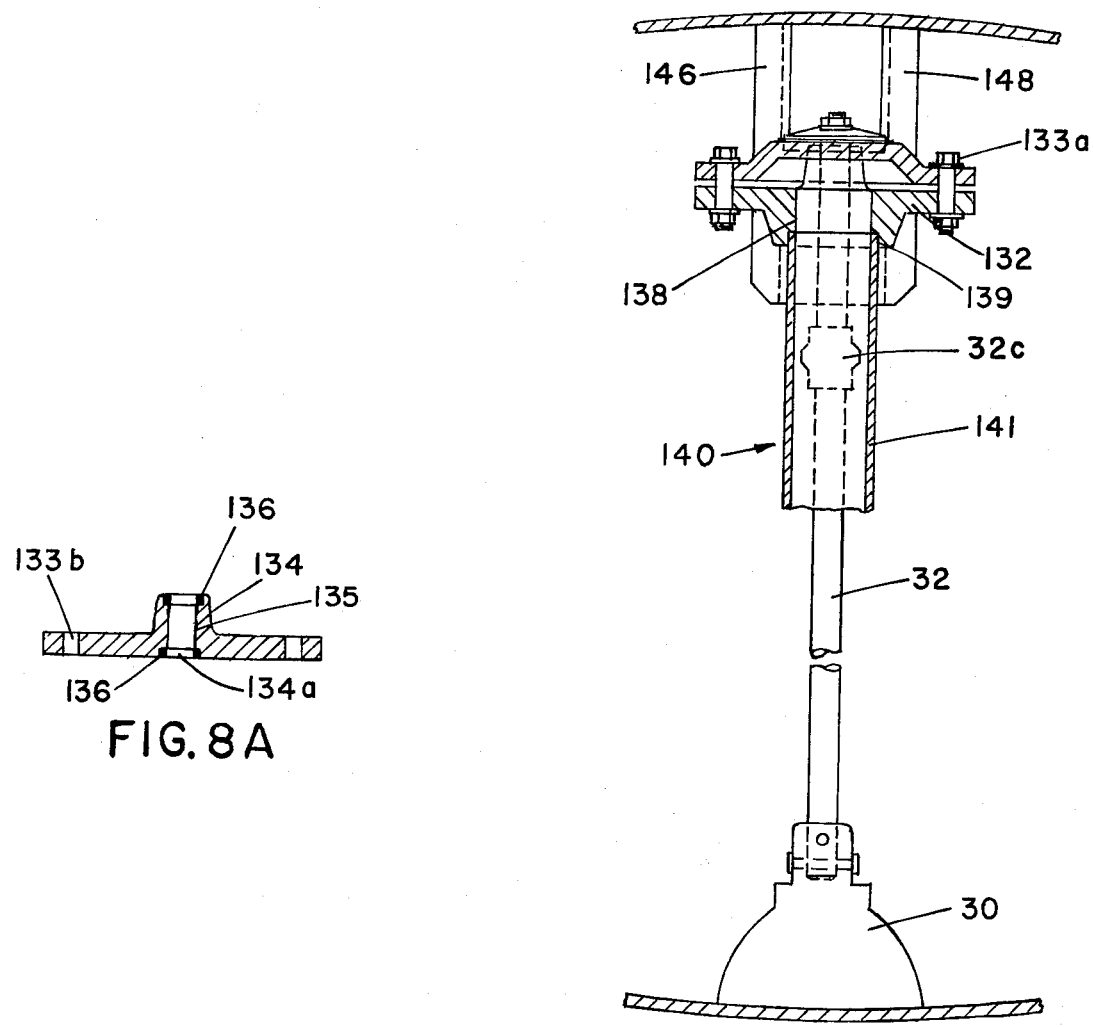
FIG. 8A
FIG. 7
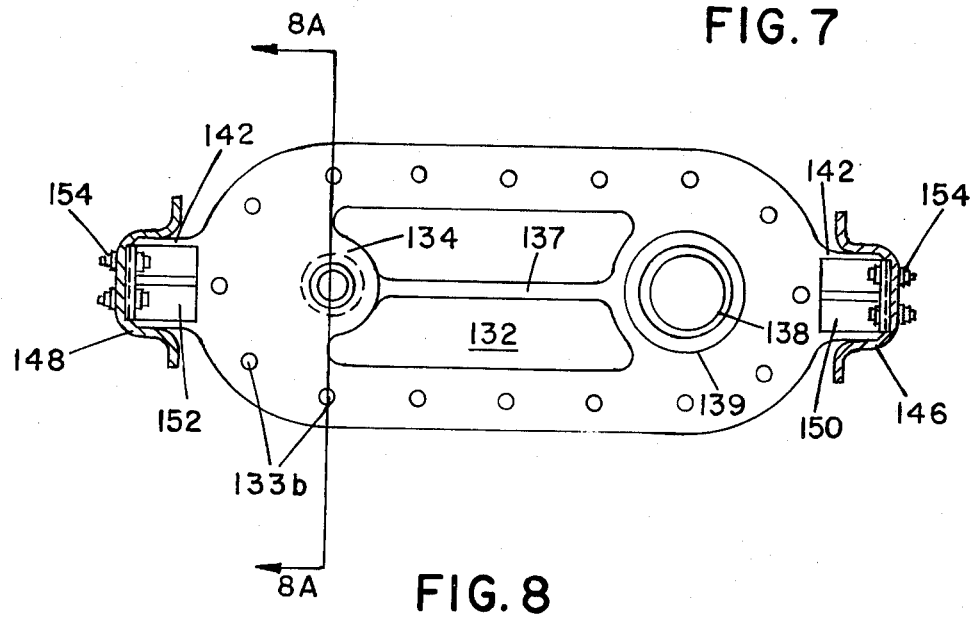
FIG. 8

AUTOMATIC AIR INLET AND OUTLET VALVE ASSEMBLY

This is a continuation of application Ser. No. 808,916, filed June 22, 1977, now abandoned.

BACKGROUND OF THE INVENTION

In U.S. Pat. No. 3,981,481 granted Sep. 21, 1976 assigned to the same assignee as the present application, a bottom operable tank lading loading and unloading valve is disclosed. Such bottom operable tank lading valves allow the operator to operate the lading valve without going on top of the tank. Thus the danger of the operator falling off the tank while operating the lading valve is eliminated.

However during loading and unloading a tank it is necessary to provide a valve to allow air to enter the tank during unloading and allow air to leave the tank while the tank is being loaded. In the past most such air inlet and outlet valves have been located on top of the tank, and operable from the top of the tank. Thus the operator must climb on top of the tank in order to operate such prior art air inlet and outlet valves during loading and unloading the tank.

In application Ser. No. 757,121 filed Jan. 5, 1977 Attorney Docket No. 432, assigned to the same assignee as the present application, an air inlet and outlet valve is mounted within an opening in the top of a transportation tank, for example a railway tank car. The valve is operable from the bottom of the tank by means of an operating shaft which extends from the bottom of the tank up through the tank to the valve. The operating shaft includes shaft telescoping means located within the tank such that the upper part of the operating shaft may move vertically relative to the lower portion of the shaft. As the top of the tank moves relative to the tank bottom, for example under impacts to the tank, the upper portion of the operating shaft will move downwardly relative to the lower portion of the shaft by virtue of the shaft telescoping means, and the valve will remain closed during such downward movement while allowing opening and closing of the valve from the bottom of the car by means of the operating shaft. However the operator must manually open and close this air inlet and outlet valve.

In application Ser. No. 728,343, filed Sep. 30, 1976 a manually operable air inlet and outlet valve is mounted in the bottom of the tank. A conduit extends from the bottom of the tank to a stilling well located in the upper portion of the tank. The stilling well allows air to enter or leave during unloading and loading, and a ball located in the stilling well prevents the lading from entering the conduit and leaving the conduit when the valve is opened. However, again, the operator must manually open and close this air inlet and outlet valve.

It would be desirable to have an air inlet and outlet valve which opens and closes automatically when the bottom operated lading valve is opened and closed, and which will not be damaged when the top of the tank moves downwardly relative to the remainder of the tank.

SUMMARY OF THE INVENTION

In accordance with the present invention an air inlet and outlet valve is disclosed which automatically opens and closes when a bottom operable tank lading valve is opened and closed. The valve is mounted adjacent the top of the tank above the maximum lading height. The air valve opens and closes an opening into a chamber in fluid communication by means of a conduit means with an opening in the tank. The air valve is automatically operated when the lading valve opens by means of air valve linkage means including an operating shaft which extends from the lading valve up through the tank to operate the valve. Support structure attached to the bottom of the tank supports the air valve linkage means. The air valve and the air valve linkage means are located relative to the top of the tank such that when the top of the tank moves downwardly relative to the tank bottom, the top of the tank will not strike the air valve or the valve operator linkage means. If air enters and leaves through an opening located in the bottom of the tank, the conduit means may comprise piping extending from the chamber to the bottom of the tank which supports the air valve and the air valve linkage means in position within the tank.

THE DRAWINGS

FIG. 2 is a sectional view looking in the direction of the arrows along the line 2—2 in FIG. 1;

FIG. 3 is a sectional view looking in the direction of the arrows along the line 3—3 in FIG. 2;

FIG. 4 is a sectional view looking in the direction of the arrows along the line 4—4 in FIG. 3;

FIG. 5 is a view looking in the direction of the arrows along the line 5—5 in FIG. 3;

FIG. 5A is a view looking in the direction of the arrows along the line 5A—5A in FIG. 3;

FIG. 7 is a sectional view looking in the direction of the arrows along the line 7—7 in FIG. 6;

FIG. 8 is a view looking from the bottom along the line 808 in FIG. 6;

FIG. 8A is a sectional view looking in the direction of the arrows along the line 8A—8A in FIG. 8;

DESCRIPTION OF PREFERRED EMBODIMENTS

Figure 1:
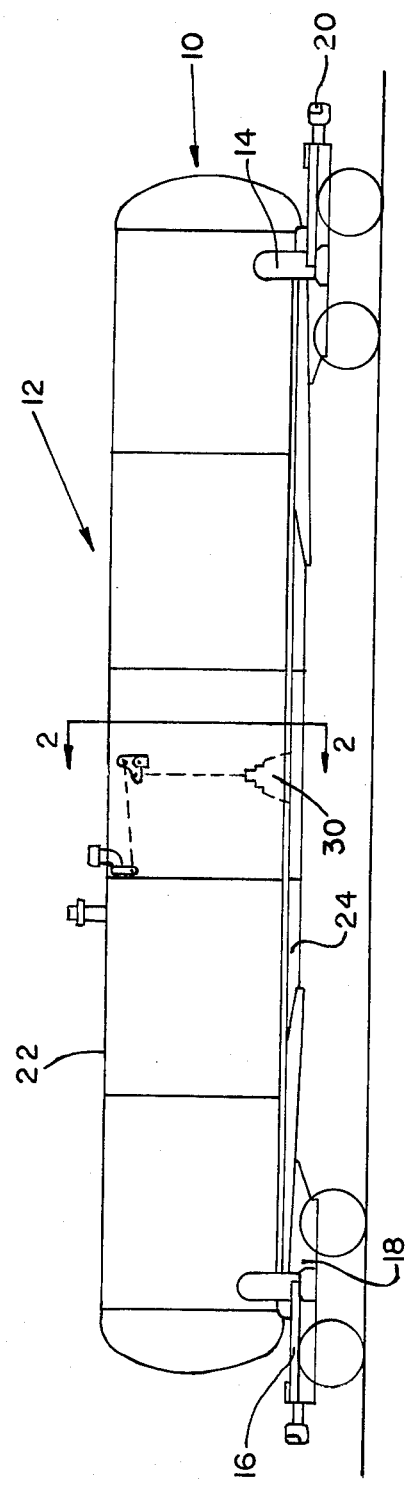
FIG. 1 is a side elevation view of a railway tank car with which the automatic air inlet and outlet valve assembly of the present invention may be utilized.
Figure 6:
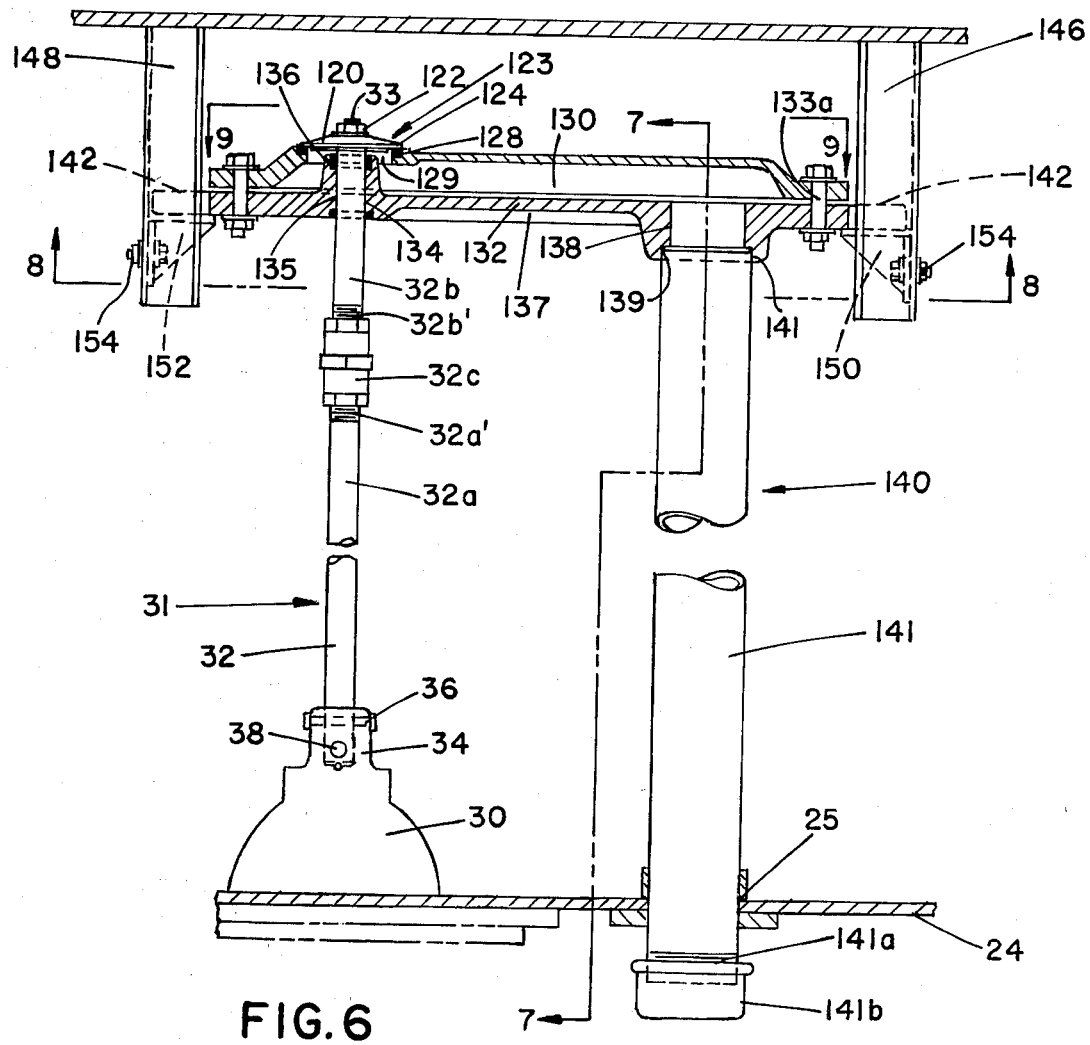
FIG. 6 is a sectional view similar to FIG. 3 of another embodiment of the automatic air inlet and outlet valve of the present invention.
Figure 9:
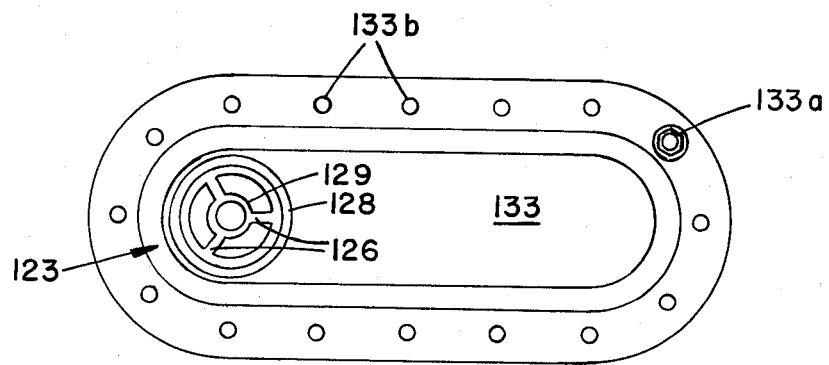
FIG. 9 is a view looking from the top in the direction of the arrows along the line 9—9 in FIG. 6 with the valve removed.

The air inlet and outlet assembly of the present invention may be utilized in an overland tank truck, an intermodel truck container or in a container mounted in a ship. However, the air inlet and outlet valve assembly of the present invention is particularly adapted for use in a railway tank car. Therefore the assembly will be described and illustrated in connection with its application to a railway tank car.

In the drawings, a railway tank car 10 is illustrated in which a tank 12 is mounted upon cradles 14 which are supported by stub sills 16 and trucks 18 at opposite ends of the car. A conventional coupler 20 and a draft gear (not shown) are mounted within the stub sills. The tank includes a tank top 22 and a tank bottom 24.

The tank car may be loaded and/or unloaded through a bottom operated lading valve 30, for example, constructed according to the teachings of U.S. Pat. No. 3,981,481 granted Sep. 21, 1976, assigned to the same assignee as the present application which is hereby incorporated into this application by this reference. Reference may be made to this patent for a detailed description of the bottom operable lading valve.

Air valve linkage means 31 including a vertically extending shaft 32 extends within the upper portion 34 of the valve 30 and a fastener 36 extends through the valve 30 and through the shaft 32 to maintain the shaft in engagement with the valve. If desired, a second fastener 38 may extend through the valve and the shaft in another direction. Air valve linkage support means indicated generally at 40 including steel support plates 42 are attached to the bottom of the tank in any convenient manner such as by welding. Plates 42 support a horizontal plate 44 having an opening 46 through which shaft 32 passes. Vertically extending support rods 48 extend through openings 47 and 49 in plate 44 and are threaded at 50 to receive fastening nuts 51 to maintain support rods 48 in place. A plurality of transverse support plates 52 may be provided at vertically spaced locations in the tank. Each support plate includes openings 54, 56 and 58 respectively, for rods 48 and shaft 32 to pass through.

In the upper portion of the tank but spaced downwardly from the tank top 22 is a linkage support plate 62. Linkage support plate 62 includes openings 64, 65, and 66 through which rods 48 and shaft 32 pass. Rods 48 may be provided with a shoulder 67 threaded at its upper end 68 to receive fasteners 69 to hold support plate 62 in place.

Air valve linkage means 31 further includes a bell crank indicated generally at 70 mounted upon support plate 62. Bell crank 70 includes a bell crank support 72 rigidly attached to support plate 62, including a pair of bell crank support arms 72a and 72b (FIG. 2). Bell crank body portion 74 is pivotally mounted about bell crank support 72 by means of pin 75. Shaft 32 is attached to a first bell crank arm 76 by means of pin 78.

A laterally extending air valve linkage 80 is provided including clevis 82 which is attached to a second bell crank arm 79 by means of a pin 84. Clevis 82 is hollow and is threaded to receive threaded end 86 of shaft 85. Shaft 85 is slidably movable within cylinder wall 88a and within cylinder 88. The opposite end of shaft 85 is provided with a head 89 which holds in place an extension spring 90. A linkage rod 92 has a threaded end 93 which engages cooperating threads 88b provided in the cylinder 88. Rod 92 has an opposite threaded end 94 which is attached to a clevis 95.

Clevis 95 is attached by means of a pin 96 to a generally vertically extending air valve pivot member 98. Air valve 100 is integral with, or rigidly attached to pivot member 98. Pin 102 mounts pivot member 98 and a torsion spring 104 about a depending extension 105 of valve seat 106. Air valve 100 seats on a valve seat 106. A conduit means 107 is attached to valve seat 100 including a pipe coupling 109 having threads 108 which engage an elbow 110 having an approximately 90 degree bend. Torsion spring 104 is biased to move air valve 100 to the closed position. Conduit means 107 and air valve 100 define a chamber 101. Elbow 110 is in communication with a vent member 112 by means of a pipe 113 mounted in an opening 23 in the top of the tank. A mounting plate 114 and welding 115 hold vent member 112 in place. Vent member 112 directs air and vapors out of the vent and downwardly through opening 116; and allows air to enter the vent 112 through opening 116 and pass into the tank through conduit means 107 when air valve 100 is in the open position.

In operation as lading valve 30 is opened as described in U.S. Pat. No. 3,981,481 shaft 32 moves vertically relative to air valve linkage support structure 40 and support plate 62, pivoting bell crank 70 about the bell crank support 72, moving bell crank arms 76 and 79 clockwise and clevis 82 and shaft 85 horizontally (to the right in FIG. 3) against the bias of spring 90. However shaft head 89 bottoms out near cylinder end wall 88a. Linkage rod 92 and clevis 95 then move to the right in FIG. 3 which pivots pivot member 98 and air valve 100 about the pin 102 and valve seat extension 105, agains the bias of torsion spring 104, to allow air and vapors to exit through conduit means 107 and the vent member 112. When the lading valve 30 is closed the reverse occurs. Shaft 32 moves downwardly and bell crank rotates in a counterclockwise direction. Clevis 82 and shaft 85 move to the left. Shaft head 89 aided by the bias of spring 90 bottoms out on the inner end 93 of linkage bar 92. Bar 92 moves to the left in FIG. 2 which pivots air valve 100 assisted by the bias of spring 104 into the closed, seated position on valve seat 106.

The vent member 112 and conduit means 107 are laterally displaced relative to shaft 32 to allow the tank top 22 to move downwardly relative to the tank bottom 24 and the air valve linkage support structure 40. When tank top 22 moves downwardly relative to the tank bottom 24, spring 104 is sufficiently stiff to maintain air valve 100 in seated position on valve seat 106.

Shaft 92 will move from right to left in FIG. 3 and cylinder 88 will move to the left and spring 90 will be compressed to permit the vertical movement of tank top 22, pivot member 98 and air valve 100 relative to support structure 40 and bell crank 70, which remain fixed. When the tank top returns to its original position, shaft 92 moves from left to right aided by the bias of spring 90.

Thus this embodiment provides automatic opening and closing of the air inlet valve by means of air valve linkage means 31, and the conventional venting of air and vapors through the top of the tank, while permitting vertical movement of the tank top relative to the tank bottom.

Another embodiment of the present invention is illustrated in FIGS. 6-9 of the drawings. As was the case with the embodiment illustrated in FIGS. 2-5, air valve linkage means 31 including a vertically extending shaft 32 is attached to the upper portion 34 of lading loading and unloading valve 30. The upper portion of shaft 32 is attached to a vertically movable air inlet and outlet valve 120 by a means of a threaded fastener 122 which engages threaded end portion 33 of shaft 32. Valve 120 is generally dished shaped and seats on a valve seat 123 having a circumferential seat portion 124 and valve 120 reinforcing ribs 126 (FIG. 9), engages a seal 128 surrounding an opening 129 into air valve chamber 130.

An air valve chamber 130 is defined by a lower valve chamber member 132 and an upper valve chamber member 133. Fasteners 133a engage openings 133b to hold in place upper valve chamber member 133 upon lower valve chamber member 132. Lower valve chamber member 132 includes a shaft guide and support portion 134 (FIGS. 6, 8 and 8A) having an opening therein 134a and a guide surface 135 through which shaft 32 passes. The upper portion of guide surface 135 is provided with a shaft bearing 136. A reinforcing rib is provided at 137.

Lower chamber member 132 further includes another opening 138 having a counter bore 139 which communicates with a conduit means 140 including a vertically extending pipe 141 which passes through an opening 25 in the tank bottom 24, and is rigidly attached to the bottom of the tank, for example by welding. This vertically extending pipe 141 may be provided of suitable material and thickness to have sufficient rigidity to function as the air valve linkage support structure 40 provided in the embodiment shown in FIGS. 2-5. Pipe 141 is provided with a threaded end 141a and removable cap 141b.

Lower chamber member 132 is further provided with end portions 142 and 144 which extend into a pair of depending hat shaped members 146 and 148 which are rigidly attached to the top of the tank, for example by welding (FIG. 7). Brackets 150 and 152 are provided which are attached to the respective hat sections 146 and 148 by means of appropriate fasteners 154 illustrated in FIGS. 6 and 8.

If desired, vertical shaft 32 may be provided in two portions 32a and 32b, each shaft portion having respective threaded end portions 32a' and 32b', which are joined by a connecting nut 32c. Nut 32c is tightened sufficiently in assembly to insure that air valve 120 assumes a seated sealed position upon seal member 128 when lading valve 30 is in the closed position in the bottom of the tank.

In the operation of this embodiment pipe cap 141b is first removed from pipe 141. When the lading valve 30 is opened, linkage means 31 moves vertically with shaft 32 moving through shaft guide portion 134, moving air valve 120 from the closed to an open position providing communication between the air valve chamber 130 and the inside of the tank through opening 129. During unloading air may enter through pipe 141 into chamber 130 and then into the tank through opening 129. During loading air may exit through opening 129 into chamber 130 and then outwardly through pipe 141. If desired, a conduit (not shown) may be attached to pipe threads 141a to allow removal of dangerous vapors from the unloading area and/or recycling the vapors to the container from which the lading is being loaded.

When the top of the tank moves downwardly relative to the bottom of the tank, for example under impact, air valve chamber end portions 142 guide vertical movement of hat sections 146 and 148. While such vertical movement is taking place, the lower chamber member 132 is supported by pipe 141 from the bottom of the tank. After the tank top returns to its normal position, the end portions 142 are again supported by brackets 150 and 152 attached to depending hat sections 146 and 148.

Figure 10:
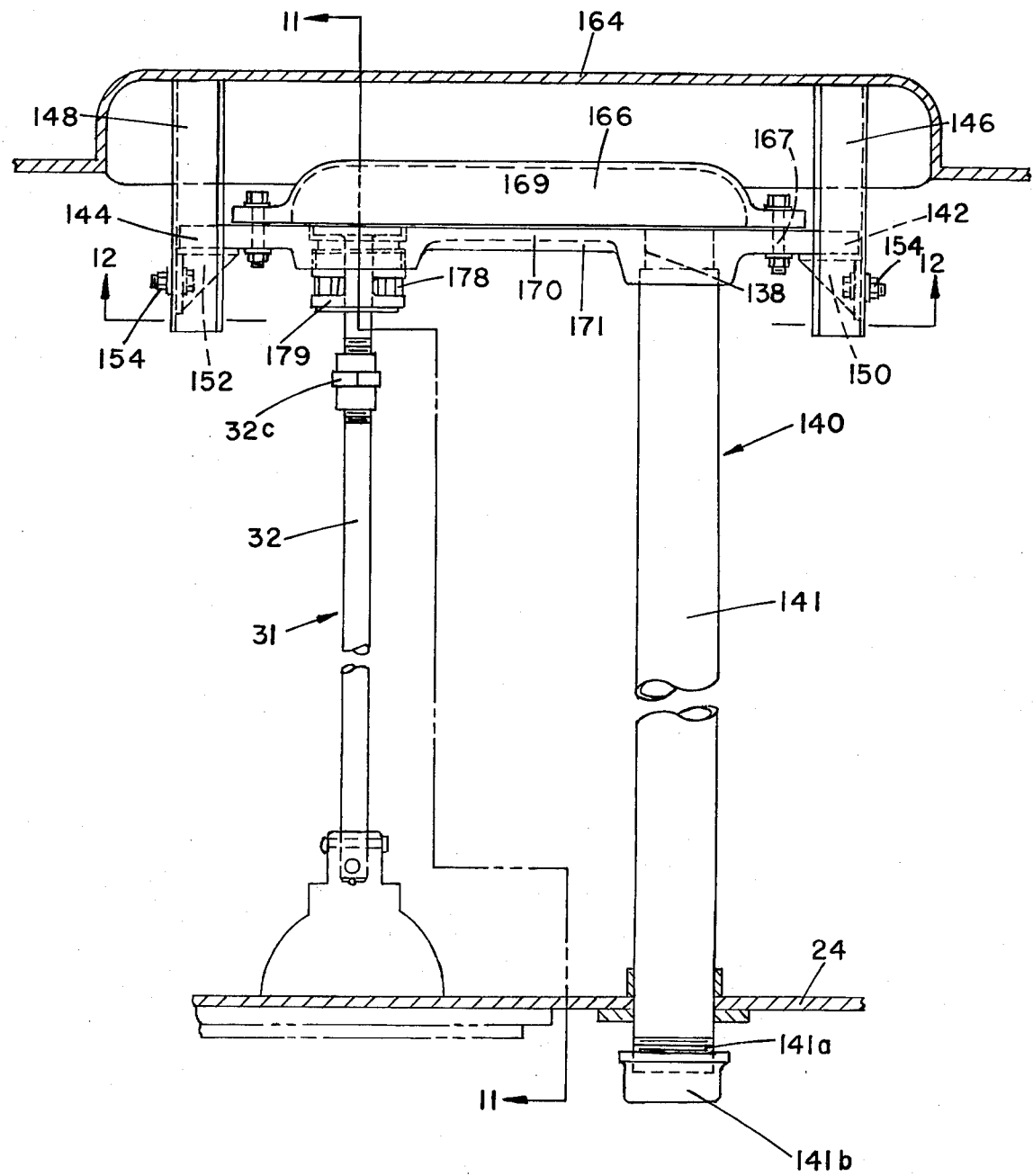
FIG. 10 is a sectional view similar to FIG. 3 of another embodiment of the automatic air inlet and outlet valve of the present invention.
Figure 11:
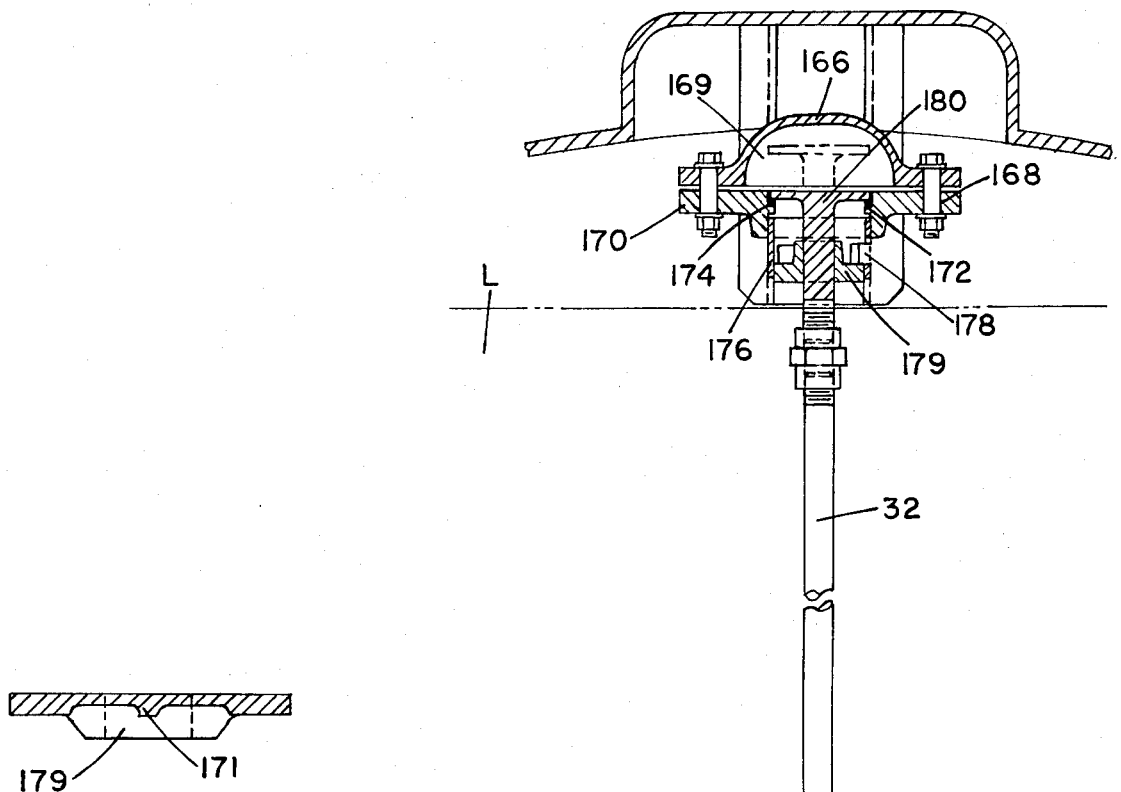
FIG. 11 is a sectional view looking in the direction of the arrows along the line 11—11 in FIG. 10.
Figure 12A:
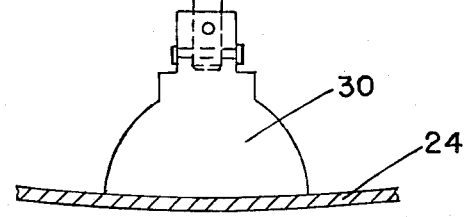
FIG. 12A is a sectional view looking in the direction of the arrows along the line 12A—12A in FIG. 12 with the guide removed.
Figure 12:
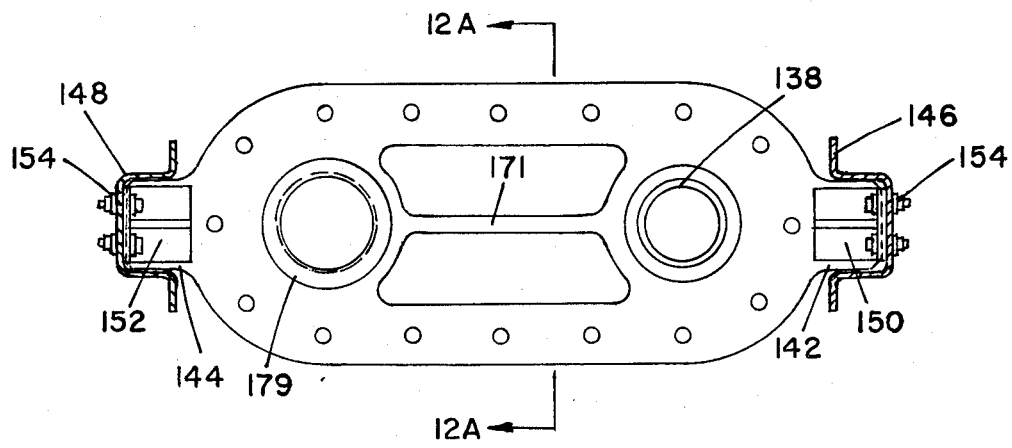
FIG. 12 is a view looking from the bottom along the lines 12—12 in FIG. 10.

The embodiment shown in FIGS. 10-12A is similar to the embodiment shown in FIGS. 6-9. However in this embodiment the tank top is provided with a dome 164. Depending hat shaped members 146 and 148 depend from this dome 164 (FIG. 10). Upper chamber member 166 is also dome shaped as shown in FIG. 11.

Fasteners 167 extend into openings 168 to mount upper chamber member upon lower chamber member 170. Lower chamber member 170 is contoured for example by machining as illustrated in FIG. 11 including a valve seat portion 172 upon which a seal 174 is mounted. Lower chamber 170 includes a reinforcing rib 171. A depending sleeve 176 is also provided within lower chamber member 170 which is threaded. Sleeve 176 includes a plurality of circumferentially spaced openings 178. Lower chamber member includes a shaft support and guide portion 179. However in this embodiment the air valve 180 is integral with shaft 32. Air valve 180 may be formed as a part of shaft 32 as shown in FIG. 11, or may be welded to shaft 32, or attached to shaft 32 with fasteners (not shown). As shown in FIG. 10 the opening 138 in lower chamber member communicates with conduit means 140 including a pipe 141 constructed in the same manner as the embodiment shown in FIGS. 6-9.

In the operation of this embodiment cap 141b is first removed. During unloading when the lading valve 30 is moved to the open position, shaft 32 moves vertically through support and guide portion 179 to move valve member 180 relative to seal 174 and lower chamber seat 172. Air enters through pipe 141 into chamber 169 and then into the tank through openings 178. During loading of the tank, air may exit through openings 178 into chamber 169 and out through pipe 141. If desired a conduit may be attached to the threaded end 141a to conduct the vapors away from the unloading side and/or to the container from which the lading is being loaded.

In FIG. 11 note that the openings 178 are located above the lading level L. When the top of the tank dome 164 moves downwardly relative to the bottom of the tank 24, the hat shaped sections 146 and 148 are again guided vertically relative to the upper and lower chamber members 166 and 170 by end portions 142 and 144. The air valve chamber members 166 and 170 are supported by the pipe 141. The dome section 164 is of sufficient vertical extent that the tank may move downwardly relative to the tank bottom 24, for example, under railcar impacts, without impacting upper chamber member 166 and at all times the openings 178 remain above the maximum height of lading in the tank to facilitate air entering and leaving the tank.

If the openings are below the level of the lading during the end of the loading operation lading would be forced into the chamber 169 and would come out through pipe 141 resulting in lading loss, and possible danger to operating personnel nearby if a conduit is not attached to conduct vapors away from the tank.

During unloading heavy lading could prevent air from entering the tank until the level of the lading above the openings is overcome by suction applied to effect unloading.

For retrofit the embodiment shown in FIGS. 6-9 is preferred which avoids the need for the dome 164. Furthermore for new tank construction fabrication of the dome 164 is an added cost. Thus the embodiment shown in FIGS. 6-9 is also preferred for new tank construction.

What is claimed is:

1. An automatic air inlet and outlet valve assembly for use in a railway tank car which automatically opens and closes when a bottom operable tank lading valve is opened and closed comprising: an air chamber located adjacent the top of the tank; an air valve movable between open and closed position relative to a chamber opening in said chamber, opening and closing fluid communication between said chamber and the interior of the tank; said chamber being in fluid communication by conduit means with an opening in the top of the tank; said air valve being automatically opened when said lading valve opens, and closed when said lading valve closes, by air valve linkage means including an operating shaft which extends from the lading valve up through the tank to the air valve; said shaft moving upwardly when said lading valve is opened and downwardly when lading valve is closed; air valve linkage support means attached to the bottom of the tank; said air valve being laterally spaced from said shaft, and said air valve linkage means including a laterally extending linkage which opens and closes said air valve; said laterally extending linkage including telescoping means whereby one portion of said laterally extending linkage will telescope relative to another portion of said laterally extending linkage means, whereby when the top of the tank moves downwardly relative to the tank bottom when said tank car is impacted, said laterally extending linkage means will telescope, said air valve will not open, and the top of the tank will not strike said air valve or said air valve linkage means.

2. An automatic air inlet and outlet valve assembly which automatically opens and closes when a bottom operable tank lading valve is opened and closed comprising:

an air valve mounted adjacent the top of the tank movable between opened and closed positions relative to a chamber opening into a chamber in fluid communication by conduit means with an opening in the top of the tank; said air valve being automatically operated when said lading valve opens and closes by air valve linkage means including an operating shaft which extends from the lading valve up through the tank to the air valve; air valve linkage support means attached to the bottom of the tank; said air valve and said air valve linkage means located relative to the top of the tank such that when the top of the tank moves downwardly relative to the tank bottom, said air valve will not open and the top of the tank will not strike said air valve or said air valve linkage means; said air valve being laterally spaced from said operating shaft, and said air valve linkage means including a laterally extending linkage which opens and closes said air valve; said chamber being defined by conduit means depending from the top of the tank; said air valve being mounted on said depending conduit means; said laterally extending linkage including a torsion spring biasing said air valve into closed position; said laterally extending linkage including a shaft which telescopes within a hollow cylinder, and wherein a resilient device of less stiffness than said torsion spring is provided in said hollow cylinder, and wherein said resilient device compresses when said tank top moves downwardly relative to the tank bottom, while said torsion spring maintains said air valve in seated position.

3. An automatic air inlet and outlet valve assembly according to claim 2 wherein said operating shaft engages a bell crank which activates said laterally extending linkage.

* * * * *